US010475348B2

(12) United States Patent
Krüger

(10) Patent No.: US 10,475,348 B2
(45) Date of Patent: Nov. 12, 2019

(54) METHOD FOR ASSISTING A PERSON IN ACTING IN A DYNAMIC ENVIRONMENT AND CORRESPONDING SYSTEM

(71) Applicant: HONDA RESEARCH INSTITUTE EUROPE GMBH, Offenbach/Main (DE)

(72) Inventor: Matti Krüger, Offenbach (DE)

(73) Assignee: HONDA RESEARCH INSTITUTE EUROPE GMBH, Offenbach-Main (DE)

( * ) Notice: Subject to any disclaimer, the term of this patent is extended or adjusted under 35 U.S.C. 154(b) by 0 days.

(21) Appl. No.: 15/997,930

(22) Filed: Jun. 5, 2018

(65) Prior Publication Data

US 2018/0357913 A1 Dec. 13, 2018

(30) Foreign Application Priority Data

Jun. 9, 2017 (EP) .................................... 17175162

(51) Int. Cl.
*B60W 40/08* (2012.01)
*G08G 9/02* (2006.01)
*G08G 1/16* (2006.01)

(52) U.S. Cl.
CPC ............... *G08G 9/02* (2013.01); *G08G 1/161* (2013.01); *G08G 1/165* (2013.01); *G08G 1/166* (2013.01)

(58) Field of Classification Search
CPC .......... G08G 9/02; G08G 1/161; G08G 1/165; G08G 1/166
See application file for complete search history.

(56) References Cited

U.S. PATENT DOCUMENTS

2011/0128139 A1* 6/2011 Tauchi .................. B60K 35/00 340/439
2012/0025964 A1 2/2012 Beggs et al.
2015/0035962 A1* 2/2015 Nagaoka ............... G08G 1/166 348/77

(Continued)

FOREIGN PATENT DOCUMENTS

WO WO 2011/117794 A1 9/2011

OTHER PUBLICATIONS

European Search Report dated Dec. 13, 2017 corresponding to European Patent Application No. 17175162.1.

*Primary Examiner* — Munear T Akki
(74) *Attorney, Agent, or Firm* — Squire Patton Boggs (US) LLP

(57) ABSTRACT

The invention regards a method and a system for assisting a person in acting in a dynamic environment. At first, information on states at least two entities in a common environment is obtained. A future behaviour of each of the entities is then predicted based on the obtained information and a time to event for at least one predetermined event involving the at least two entities and a position of occurrence of the event relative to the person is estimated. Then, a signal indicative of the relative direction of the predicted event with respect to the person and indicative of the time to event for driving an actuator is generated, the signal causing a stimulation being perceivable by the person by its perceptual capabilities, wherein the time to event is encoded such that the signal's saliency is the higher the smaller the time to event is.

16 Claims, 5 Drawing Sheets

(56) References Cited

U.S. PATENT DOCUMENTS

| | | | | |
|---|---|---|---|---|
| 2015/0091740 | A1* | 4/2015 | Bai | G08B 21/06 340/901 |
| 2016/0046285 | A1* | 2/2016 | Kim | G08G 1/133 340/932.2 |
| 2017/0069212 | A1* | 3/2017 | Miyazawa | B60K 35/00 |
| 2017/0309178 | A1* | 10/2017 | Hernandez | G08G 1/163 |
| 2018/0005503 | A1* | 1/2018 | Kaindl | G08G 1/166 |
| 2018/0090007 | A1* | 3/2018 | Takemori | B60K 35/00 |
| 2018/0118106 | A1* | 5/2018 | You | B60Q 5/008 |

* cited by examiner

METHOD FOR ASSISTING A PERSON IN ACTING IN A DYNAMIC ENVIRONMENT AND CORRESPONDING SYSTEM

BACKGROUND

Field

The invention regards a method and a system for assisting a person in acting in a dynamic environment.

Description of the Related Art

Acting in a dynamic environment becomes more and more demanding the more entities are involved in such dynamic environment. A prominent example is traffic. In many areas of the world, the traffic volume is increasing. As result a driver of a vehicle has to cope with an increasing amount of pieces of information in order to make the best decision how to drive the vehicle. Many different developments were made that assist the driver in driving. One important aspect is that any information that is provided by a system that is capable of perceiving the environment of a person or a vehicle does not need to be perceived directly by the vehicle driver or a person in any other dynamic environment. Thus, the person can concentrate on other aspects of a scene. Filtering information with respect to its importance can be performed in many cases by such assistance systems.

Of course, a traffic situation is only one example where it is desirable to assist a person in perceiving all (relevant or important) aspects in his environment and in filtering information. It is evident that such assistance systems are also suitable for a person navigating a boat or a ship or any other person that has to react in a dynamic environment like for example a skier. Most of such assistance systems analyze a scene that is sensed by physical sensors and assist for example a vehicle driver by presenting warnings, making suggestions on how to behave in the current traffic situation or by (partially) autonomous driving. These systems in many cases have the disadvantage that they require the driver to actively shift his or her attention in order to achieve successful information transmission. Thus, the driver's concentration on other aspects of a traffic scene is distracted which may in turn result in a reduction of safety. It would be advantageous if there was a way to provide information to a driver or any other person that extends the person's receptive field without necessarily requiring active shifts in attentional resources otherwise employed for the driving task. Thus, information would be available that the person could otherwise not use for deciding on how to act. Such human sensory enhancement for dynamic situations is particularly advantageous in situations where entities move relative to one another.

In the past attempts have been made to communicate for example a distance and/or a direction of an entity with respect to a person to this person. As a consequence the person who may not even have recognized the other entity, for example because this entity was occluded or way out of the line of sight, can nevertheless react, because he is informed about the existence and proximity of such entity. Although this already improves environment perception of a person, in particular when available senses of a human are used that are not used actively by a person, e.g. tactile perception. One such known system is a blind spot surveillance system that observes an area of the environment of a vehicle, which is usually not observed actively by a vehicle driver who focusses on the area in front of the vehicle. In case that another vehicle is close to the ego-vehicle in an unobserved area, a warning will be output to the driver. In many cases vibration of the steering wheel is used to stimulate the driver. This is a typical example how a sensory capability of a driver which is not actively used to perceive the environment can be used to provide additional information which is in turn then used by the driver for improved assessment of the entire traffic situation. In the described example the driver will be alerted of another vehicle which is driving in the blind spot of the vehicle driver and thus he can quickly have a look to get full knowledge of the situation of which he was previously unaware.

SUMMARY

The object of the present invention is to assist a person in judging a situation in a dynamic environment by providing the person with easy to recognize information about potential events relating to task-relevant entities.

This object is achieved by the claimed method and system according to the independent claims. According to the inventive method a person is assisted in acting in a dynamic environment by obtaining information on states of at least two entities in a common environment of these entities. The system comprises a state information obtaining unit that at least consist of one sensor, e.g. camera, laser sensor, radar, lidar or there sensor capable of physically sensing the environment of the system. The system may also use communication means to obtain information from the at least one further entity, such as car-to-car communication or the like. Based on this obtained information then the future behaviour of each of the entities is predicted or estimated by a processor which is provided with the obtained information, maybe after pre-processing of the data that contains the information. Further, a time to event is estimated for at least one predetermined event involving the at least two entities and also a position of occurrence of this event relative to the person or an entity associated with/controlled by the person is estimated. The estimation process is performed in the processor. The two entities are in particular the person which shall be assisted in acting or a vehicle or avatar operated by this person. Such vehicle is called an ego-vehicle. Then, the second of the at least two entities and any further entity are other traffic participants or other persons, for example. Of course, these further entities do not necessarily have to be other vehicles or persons but may also be infrastructure elements or any other object in the surrounding of the person or its ego-vehicle respectively. The entity associated with the person might be for example a non-moving entity such as an infrastructure element that is associated with an air traffic controller.

Based on the estimated position of occurrence of the event and also the time to event a signal is generated which is suitable to cause a stimulation of at least one of the human senses and which indicates the direction of the predicted event with respect to the person and also the time to event by the signal generating unit. This signal is perceivable by the person by its perceptual capabilities, because the person is stimulated by an actuator based on the signal. The time to event is encoded such that the signal's saliency is the higher the smaller the time to event is. The time to event particularly may be a time to contact (collision, TTC), preferably a contact or collision between an ego-vehicle such as a car, boat, ship, motorbike, bicycle or the like and another traffic participant or any other object. Contrary to known systems, which only indicate if a measured distance between these entities falls under a lower threshold for a distance and then alert the driver, the present invention has the advantage that the time to event is directly communicated to a person instead by modulating the perceived signal's saliency. Thus, even if such an event occurs at a position having a larger distance to for example the ego-vehicle, this particular event happens first and it is necessary to draw the person's or driver's attention to this direction at first. Even if another object is closer to the person or ego-vehicle, the person might have more time to recognise the object, analyse the entire situation and decide on how to act or react. As the driver's or person's attention, when assisted by the present invention, is always implicitly directed towards the next (relevant) event to occur, this means a significant improvement in safety.

The invention is detailed in the sub-claims which all refer to advantageous embodiments of the present invention.

It is in particular advantageous to adapt a time to event estimation or the generated signal to a possibly relevant context of the situation in order to make context-dependent alterations to the time to event estimation or the generated signal which especially concerns the consideration of variables that may be thought to be relevant or beneficial for task performance. Examples for such alterations may be individual trajectory predictions for a person as an operator of a vehicle, different vehicles, but also environmental factors as well as other possibly relevant contextual factors. In case that the time to event is a time to collision, it could for example be a strategic choice to communicate more conservative time estimates. In that case the time to collision that is in fact communicated to the person, is chosen to be slightly shorter than the actually estimated time to collision. The time to collision is then at first estimated and then reduced by a time interval which may also be dependent on the absolute estimated time to collision or other contextual variables. According to another preferred embodiment the estimation process itself is adapted. As mentioned above this might be achieved by adapting parameters of the estimation (prediction) algorithm like for example trajectories that are specifically chosen dependent on a vehicle's operator.

According to a further preferred embodiment, the signal is used to generate a tactile stimulation which stimulates person at a dedicated location of the person's body to encode the relative position, wherein one or more parameters of the tactile stimulation are adapted to encode the time to event. Such tactile stimulation may be generated by an array of tactile actuators that are arranged for example in a seat or backrest of a vehicle seat and/or a seatbelt or a jacket or the like. By stimulating different portions of the human body, the direction of the predicted event is either indicated directly which means that when the stimulation occurs in the area of the bellybutton, the event will occur directly in front of the person. When the stimulation is performed at the right side of the torso, the event will take place to the right of the person and so on. Alternatively, and in particular in case that the tactile actuators cannot be arranged to surround the body of the person, it is also possible to use different parts of the body which are learnt to map a particular direction. In any of these cases the saliency of the signal which could in this case be modulated by the strength or intensity of the stimulation, indicates the time to event. A strong stimulation corresponds to the event occurring soon, whereas a modest stimulation indicates that there is still a little bit of time left. In the case of vibrotactile stimulation this time to event estimation can be encoded by using the stimulus frequency, the amplitude, the wave form (amplitude modulation), interpulse interval and pulse duration. Of course a combination of either of these parameters to be made dependent on the time to event is possible. A tactile actuator may also use a pressure applied to the human body for stimulation and for communicating direction and time to event to a person. In that case another parameter which is available for expressing the time to event is the pressure level.

Alternatively or additionally, an auditory signal resulting in sound that is generated at a location representative for the relative position of an event is used. Again one or more of the parameters that define the generated sound are adapted to encode the time to event. The dependency of the parameters on the time to event is comparable to a tactile actuation and may use at least one of the parameters: frequency, amplitude or even a more complex combination thereof such as speech.

Further, alternatively or additionally the signal may be a visual signal which causes a visual stimulus generated at a location representative for the relative position, wherein one or more parameters of the visual stimulus are adapted to encode the time to event. When using visual signals the direction of the estimated event is encoded in the location of the visual stimulus and the time to event is encoded by using one or a plurality of saliency modulation parameters. Such parameters may be brightness, contrast, color, stimulus duration, blinking frequency, stimulus size, shape or pattern.

According to another advantageous embodiment, the signal is an electromagnetic signal that causes an electromagnetic stimulus interacting with the person's nervous system or body parts. The electromagnetic stimulation is applied to the person such that it stimulates at a location of the body representative for the direction or such that it is perceived to relate to a location in space, wherein one or more parameters of the electromagnetic signal are adapted to encode the time to event in the electromagnetic stimulation. Such an electromagnetic signal or the electromagnetic stimulation based on these signals is capable of altering the activity or behaviour of a user's nervous system or body parts. The stimulation itself may occur through magnetic induction such as in the case of transcranial magnetic stimulation or through the application of electric currents to a user's nerve cells. This includes indirect stimulation through conductive media. The stimulation could also be achieved with light impulses for users with available light sensitive biological tissue. This method would be particularly feasible for the use with optogenetically supplemented tissue containing optogenetic actuators such as rhodopsin. Again, the direction is encoded in the perceived location of stimulation (e.g. a specific part of the nervous system or a location in space associated with a certain pattern of neural activation) and the time to event estimates may be encoded in one or multiple parameters of the used electromagnetic signals. These parameters must be chosen such that they modulate the perceived signal saliency. Such parameters are for example voltage, amplitude, magnetic excitation, field intensity, stimulus duration, frequency and pattern.

The signal may also be a chemical signal for applying a chemical stimulation to the person such as at a location of the body representative for the relative position, wherein one or more parameters of the chemical signal are adapted to encode the time to event. Such chemical signals are signals that are capable of producing a reaction that results in an alteration of the activity of a user's nervous system or connecting organ. This activity alteration at a specific portion of the human body is used to encode the direction of the event. The saliency of the signal is used again in order to encode the time to event estimation. Parameters that may be used for adapting saliency of the signals are: quantity, application frequency, duration and pattern of stimulation, but also chemical composition and chemical agent concentration.

According to another preferred embodiment the signal is a heat signal based on which heat is generated and applied to the person at a dedicated location of the person's body to encode the relative direction, wherein the level of heat is adapted to encode the time to event.

It is particularly advantageous that the signal's saliency is compensated for a dependency on different locations of a human body. Thus, by compensating the level of heat for example it is ensured that in an area of the human body which is more sensitive to heat a small increase of the absolute heat is perceived in the same way as a large increase at another part of the body so that the person has the same impression and thus will conclude the same time to event.

It is in particular preferred that the system comprises a plurality of actuator elements for applying the respective stimulation to a person according to the respectively used type of signal. Thus, the elements may particularly be one or a plurality of the following types: vibrotactile actuator, loudspeaker, light emitter, electrode and heating element. It is particularly preferred when the plurality of elements are arranged in an array configuration and even more that the stimulation of the person is performed around the persons torso. This can be achieved by placing the elements in a vest or jacket or attaching the actuators to a plurality of different members that for example when the person is an operator of the vehicle are necessarily put around the torso or the hips of the person. One such combination of different members is using a seatbelt in combination with the seat of the vehicle.

BRIEF DESCRIPTION OF THE DRAWINGS

The structure of the system, the different method steps and using such a method and system will be come particularly apparent from the following embodiments which are described in combination with the figures in which FIGS. 1 to 7 schematically illustrate situations and signals generated for the respective situations for communicating to a person a direction of an event and also the time to event, FIG. 8 a block diagram illustrating the components of the inventive system for carrying out the method steps of the present invention.

DETAILED DESCRIPTION

FIGS. 1 to 7 show simplified two-dimensional examples for scenarios with moving entities and visual representations of directional time to contact (TTC) signals that have been determined for the respective scenarios. Based on the signals a stimulation of human body is performed. In each scenario, the entity of interest relative to which directional TTCs are determined is represented by a dark circle. White circles represent other relevant entities in the environment, for example other vehicles in a traffic scenario. The entity of interest may be any entity for which a relative position of an event, in particular a collision between entities is estimated.

According to a preferred embodiment one of the entities that are involved is the entity of interest. But also events not directly involving the entity of interest may be thought of, for example a collision between two vehicles in front of the ego-vehicle. This may be highly relevant for the ego-vehicle driver, because the crashed cars may block his lane and other vehicles may break sharply. For the following description however, it is assumed that the entity of interest is the person itself or its vehicle and other entities are other traffic participants, and the event is referred to as collision.

The direction of an outgoing arrow represents the moving direction of the attached entity and the arrow-length represents the velocity of movement into that direction. In the representation of the produced signals, the orientation of an incoming arrow represents the direction of predicted future contact and the magnitude of the arrow represents the signal component for encoding the TTC. It should be understood in a reciprocal manner such that a long arrow represents a short TTC and therefore a signal with high saliency, a short arrow a long TTC and no arrow an infinite or above a threshold TTC.

It is to be noted that the signal is the basis for a stimulation of a person an thus in the following it is also referred to the signal although the actual information is transferred to the person using a stimulation of the person based on the signal and using an actuator capable of implementing the encoded direction and saliency.

Figure 1:
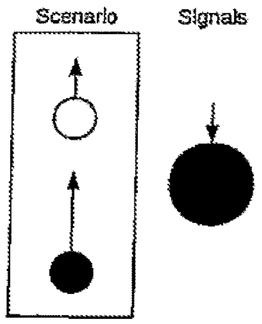

FIG. 1 shows a representation of two entities that move on the same path in the same direction, e.g. two vehicles driving on the same lane. The dark circle moves at twice the speed of the white one which means that the two are going to collide unless their relative velocities or trajectories change. From the perspective of the dark circle, a future collision on its top side is predicted and therefore the arrows representing the stimulus of the person is directed towards the top of the black circle.

Figure 2:
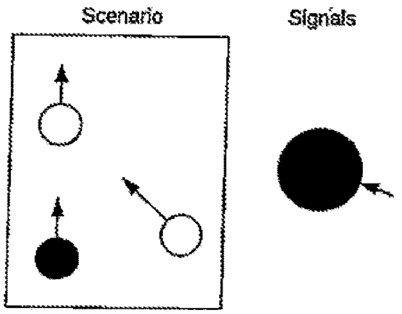

FIG. 2 shows a representation of three entities that move in a common environment. The dark circle moves at the same speed and on the same path as the white one in the top-left, for example the ego vehicle and its predecessor on the same lane. The white circle on the lower right moves at a higher speed along a different trajectory which intersects with that of the dark one. Given their present conditions, the two may collide at this point of intersection. From the perspective of the dark circle a future collision from the lower right is predicted. In comparison to FIG. 1 this collision will happen at a later point in time which is represented by the relative shortness of the arrow.

Figure 3:
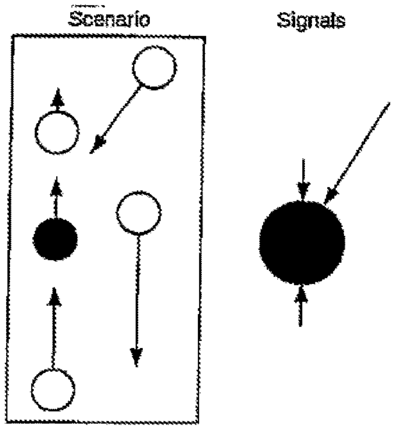

The two-dimensional example illustration of a scenario shown in FIG. 3 shows that a signal causing multiple stimulations may be created when collisions with multiple entities are predicted. As the signal is indicative of the time to event (or TTC) the person to which such event (or collision) is communicated will nevertheless be aware what direction is more urgent.

The representation shows five entities that move in a common environment. The dark circle moves along the same path as two white circles on the left side but their velocities differ in such a way that a collision with two could occur at approximately the same time. In addition one white circle (upper right) moves with a relatively high velocity towards a future location of the dark one which creates another possible future collision. No collision is likely to occur between the dark and a white circle (lower right) moving on different paths in opposite directions. From the perspective of the dark circle, collisions with multiple entities from different directions are predicted. Due to differences in relative speed the collisions on the top and the bottom are predicted to occur at the same time. The collision with the top-right circle is predicted to occur at an earlier point in time and the corresponding information in the signal is therefore represented by a longer arrow.

Figure 4:
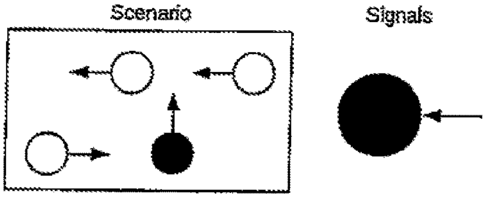

The representation in FIG. 4 shows four entities that move in a common environment. The future path of the dark circle intersects only with that of the white one on the top-right. From the perspective of the dark circle a future collision on its right side is signaled. This example is particularly useful to illustrate one of the major advantages of the invention compared to prior art approaches that only communicate a distance: The upper left entity is much closer to the entity of interest. Nevertheless, only one entity which shows a collision risk, to be more precise the direction of this collision will be communicated. The information provided is reduced to information that is in fact relevant for the person to fulfill the (driving) task. Distraction by unnecessary information can be avoided.

Figure 5:
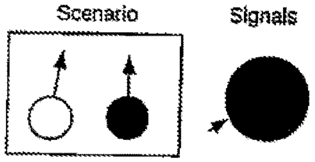

The representation in FIG. 5 shows two entities that move along two intersecting paths. From the perspective of the dark circle a collision on its lower left side is signaled. In comparison to FIG. 4, this collision will happen at a later point in time which is represented by the relative shortness of the arrow.

Because of the relative nature of the time to contact, scenarios that differ in absolute terms may yield identical signals. This will become clear when the scenarios and resulting signals in FIG. 6 and in FIG. 7 are compared respectively.

Figure 6:
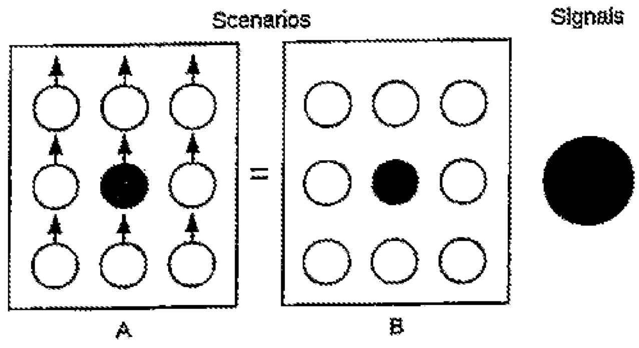

The two scenarios that are shown in FIG. 6 are identical with respect to the generated signals. No collision is predicted when no entity moves (B) as well as when all entities move uniformly at the same speed and in the same direction (A). Consequently no signal is generated, because no event is to be encoded.

Figure 7:
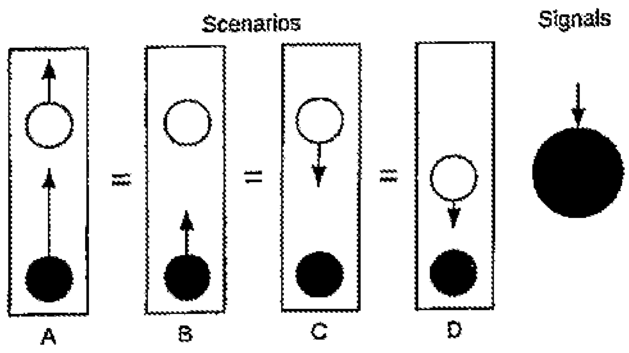

FIG. 7 shows examples for four scenarios that are identical with respect to the generated signals. The dark circle moving at twice the speed of the white circle (A) produces the same output as the dark circle moving at half of its speed compared to A towards a white circle which is not moving at all (B), the white circle moving at the same speed towards a stationary dark circle (C) and the white circle moving towards a stationary dark circle at a slower speed from a closer starting point (D).

Figure 8:
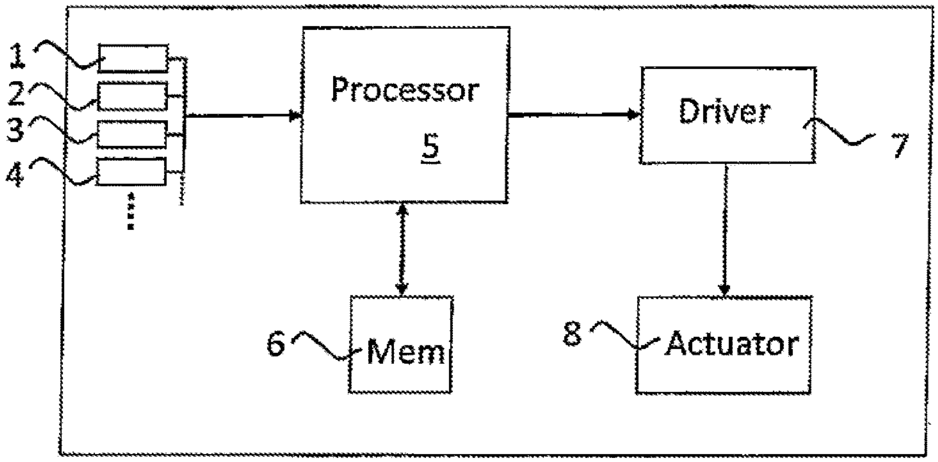
Figure 9:
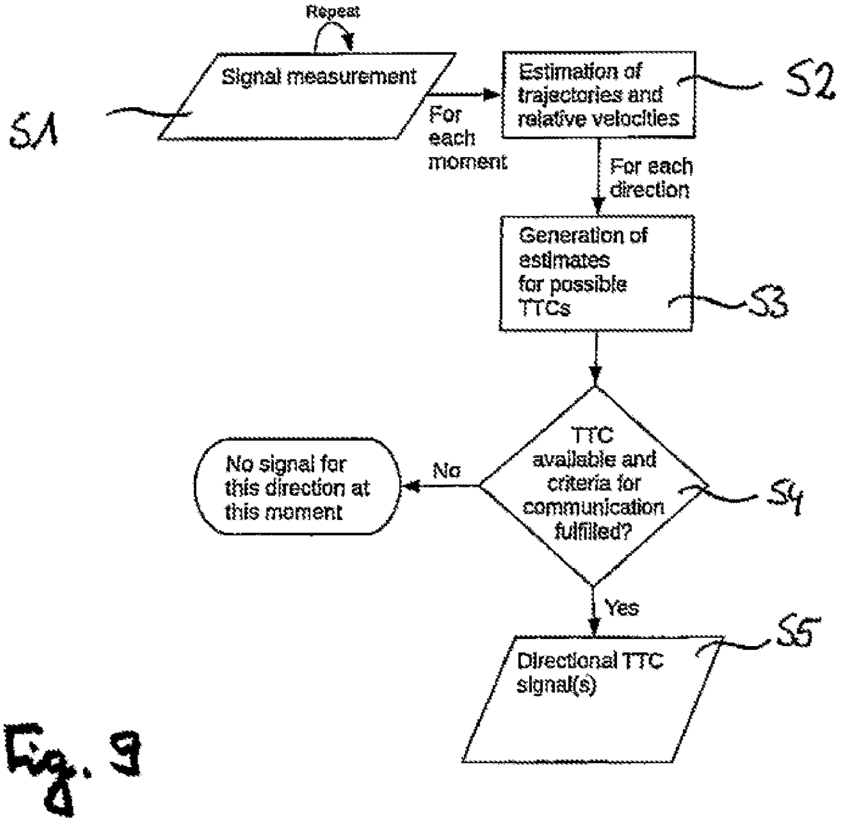
FIG. 9 a simplified flowchart illustrating the main steps of the inventive method.

FIG. 8 illustrates the system with its main components and the process of signal generation which is also shown in FIG. 9. Sensors 1-4 physically sense entities in a dynamic scenario in which entities may move relative to one another repeatedly (Step S1). In this example, TTC estimation may be achieved by incorporating information from a variety of resources.

Data from radar, cameras and/or laser scanners as examples for sensors 1-4 and built in- or onto a car are filtered for features that identify relevant entities and used to infer locations and distances.

Integration of distances and locations of entities over multiple samples may be used to infer current relative velocities.

In combination with information about the velocity and acceleration and geometry of the ego-vehicle, as well as topographic information such as about road curvature and slope obtained from an available map or based on online measurements, predictions about future collisions of the ego vehicle with other entities may be made.

This sensing is the basis for determining a relative position and velocity, relative to the person who is assisted by the system and from the sensed values information on states of the entities (direction, velocity) is derived in step S2 for every repetition. This information is stored in a memory 6 and is the basis for behavior prediction, trajectory estimation. For each measurement-iteration, individual trajectories and relative velocities of the involved entities are estimated in a processor 5 (step S2). The estimates provide the basis for inferences or predictions about possible future contact between the entity or entities of interest and other relevant entities in the environment. Also additional information that may be available and relevant for a scenario may be incorporated when making such estimates. The time to collision (TTC) estimation is performed also by processor 5 in step S3. The algorithms for predicting a future behavior (estimating a future trajectory) of the entities (including the ego-vehicle) is known in the art and thus details thereof are omitted. For the prediction procedure, probability distributions over different TTCs could be generated for each direction in which potentially relevant entities are identified. Such distributions would be advantageous in that they preserve the uncertainties associated with the available information and may be suitable for the application of signal selection criteria.

Decisions about which contact estimations should be used as the basis for directional TTC-encoding signals to be generated are made by processor 5 in step S4. Such decisions may be based on availability of predictions in a given direction, context-dependent criteria such as proximity of the event, and relevance of the respective entity and the certainty of prediction. Directional TTC estimates are encoded in signals (in step S5) based on which a person is stimulated via an interface (e.g. tactile) or not depending on the decision mentioned above. The signals are generated by a driver 7 that is adapted suitably to drive the actuator 8. Signal generation encodes a direction of a predicted collision and TTC such that one or a plurality of actuator elements of actuator 8 are driven to stimulate the person at a location of its body indicative of the direction where the event will occur and with an perceived saliency indicative of the TTC. The perhaps most straightforward approach would then be to pick the most probable TTC. However, this criterion might for instance be of little value in cases of high entropy or multiple peaks of similar height. Furthermore, a short TTC (high proximity) is in many scenarios of higher importance than a long TTC (low proximity) and could thus be given priority once it reaches a certain probability. Also the relative impact of false positive and false negative signals on driving performance should be considered in the specification of selection criteria.

The invention lets a user know, how long, given a current situation, it might take until an event, such as a collision involving an entity of interest (e.g. ego-vehicle) and other relevant entities in its environment occurs and from which direction these events are predicted to occur from the perspective of the entity of interest (which may for instance be the user, a vehicle or avatar).

The use of this information may have positive effects on situation assessment in dynamic scenarios in which entities may move relative to one another. This makes it particularly valuable in mobile scenarios such as riding a bike or motorcycle, driving a car, navigating a boat, ship or aircraft but also for skiing and snowboarding.

Some example applications for the invention are now described and partially refer to an implementation of the invention with a tactile interface but most of the advantages should still be present when interfacing via different modalities.

Driving a car in an urban area can be a perceptually demanding task due to the large amount of traffic participants, road signs, traffic lights, etc. that need to be monitored in order to avoid accidents and rule violations. In such cases it is not guaranteed that a driver notices all safety relevant objects. The present invention helps to draw a driver's attention to an aspect of a traffic situation that is about to be particularly relevant.

Scenario 1:

Making a rightward turn on an intersection with two available lanes for turning right. During the turn, another car from the left turning lane suddenly starts switching lanes without noticing that the right turning lane is already occupied. Unless the right car manages to break in time, which however could result in it getting rear-ended by a vehicle from behind, the two turning cars are going to collide. With a signal encoding a direction for an upcoming collision, the driver on the left lane would be informed about his mistake and could abort or adjust his maneuver on time. Similarly the driver on the right lane would be informed about the danger from the left and be able to react quickly.

Scenario 2:

A bicycle attempts to move straight while a car from the same direction turns right. When the driver does not see the bicycle and the bicycle rider doesn't manage to break in time the two may crash. A tactile signal providing the direction and timing of an approaching collision given the present trajectory would support the driver's situation assessment and allow him to avoid crashes with traffic participants he didn't even see or wouldn't have noticed without the tactile prompt.

Scenario 3:

An inattentive driver turning left on an intersection while another car on the opposing lane drives straight. The cars would crash if the left turning car would continue its maneuver because the car going straight is too fast to break in time. With a tactile signal which encodes the direction and TTC of an approaching collision given the present trajectory, the driver of the left-turning car would be informed about his mistake at an early stage and be able to abort his maneuver on time.

Figure 10:
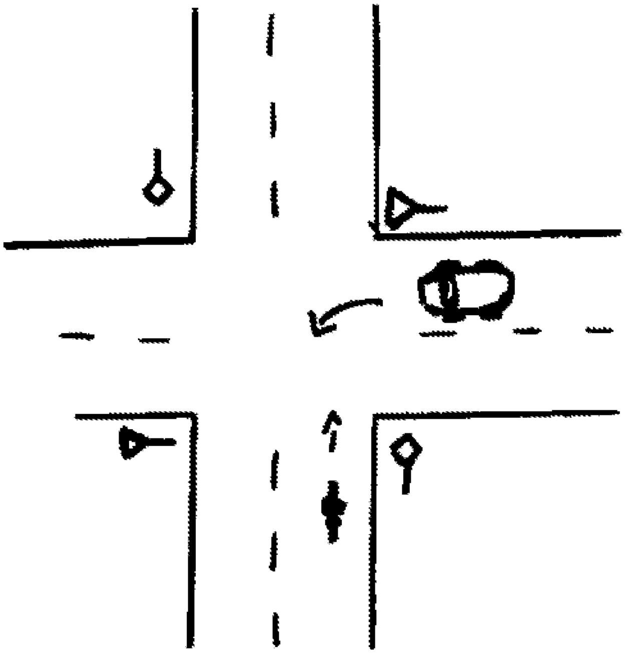
FIG. 10 a first example for an application of the present invention.

Scenario 4:

Another potentially dangerous scenario involving a left turn is illustrated in FIG. 10. A car which is on the lane of an intersection which has to give way attempts to enter the main road with a left turn. However, the driver doesn't notice the motorbike approaching from the left which has right of way. A tactile signal (meaning a signal adapted to drive a tactile actuator) encoding the direction and TTC of an approaching collision would inform the driver about the danger coming from the left and prompt him or her to delay his maneuver until the motorbike has passed. When being equipped with a similar device the motorcyclist could reduce his speed to avoid or delay the collision.

In comparison to car drivers, motorbike riders are particularly vulnerable traffic participants. Furthermore, with just two wheels their vehicles are less stable and their relatively small size can make them more difficult to spot for other road users which adds additional risk to motorbiking.

Having a good understanding of risks in the environment is therefore especially important when riding a motorbike. The advantages of signaling a directed TTC (direction of a potential collision and TTC) in various traffic situations described above for cars should also apply in the motorbike case.

The situations described so far all refer to traffic of cars, motorcycles and so on and the entities involved are all vehicles. But the invention is also useful in other scenarios.

Figure 11:
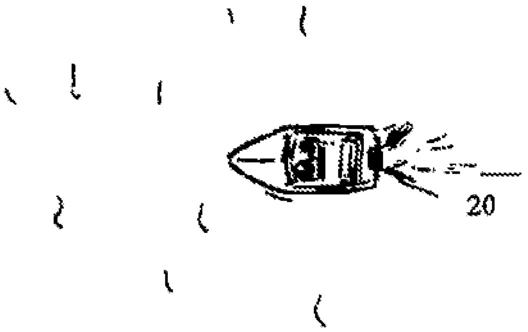
FIGS. 11*a*) and 11*b*) are a second example for application of the present invention.
Figure 11:
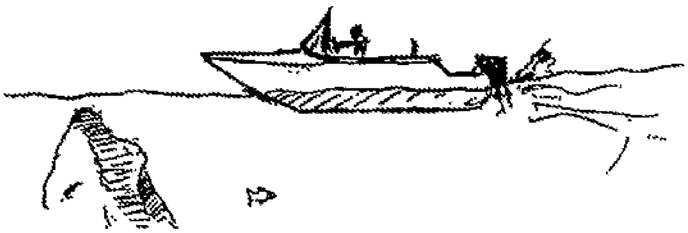

When navigating a boat or ship, the area below the water surface is often not clearly visible and even in cases where it is visible it is often difficult to visually determine the location and distance of submerged objects from above the surface. This becomes evident when the situation illustrated in FIGS. 11*a* and 11*b* is considered. While FIG. 11*a* is a bird's-eye view and more or less shows what a navigator of the boat can perceive, the side-view reveals the submerged rook. With the present invention the navigator can be informed about a direction of an upcoming danger although the rock is invisible for him.

Watercraft as well as other objects in rivers, lakes and oceans are furthermore often subject to drift and current which makes frequent adjustments necessary to maintain a course. Especially in coastal regions the space in which watercraft can move is often very limited by the underwater topography. Having a sense of the directions in which collisions are to be expected, given the present trajectory and speed, should facilitate navigation in such challenging environments. Collisions with reefs and submerged objects such as the collision of the cruise ship Costa Concordia with a submerged rock in 2012 could be reduced.

Figure 12:
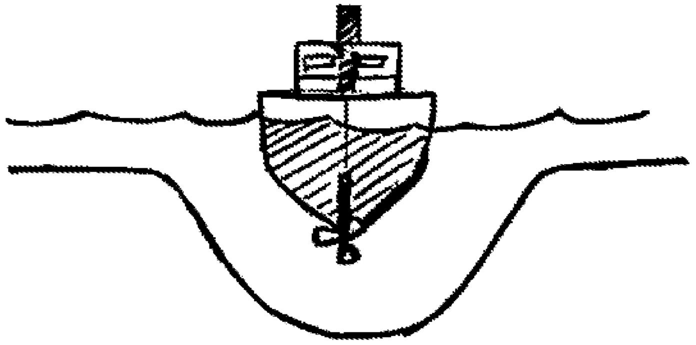
FIG. 12 a third example for application of the present invention.

One might argue that in such cases providing information about the absolute distance towards objects would be sufficient. However, for instance in narrow passages as shown in FIG. 12, the navigator of a ship would then constantly be alerted about nearby obstacles on the sides even if the course of the ship would make a collision very unlikely. A signal that communicates the predicted TTCs would be less annoying, more relevant and naturally appropriate with respect to speed and trajectory. The navigator of the ship in FIG. 12 would receive no signal when moving the ship on a straight path through a straight channel. A curve in the channel later on would be indicated by a stimulation based on a signal with increasing saliency as the curve is approached by the ship and a decrease in saliency as well as change in location when the appropriate turning maneuver is eventually performed. Assuming the ship is subject to a current from the side, the navigator would sometimes receive stimulations from the side in response to lateral acceleration towards the shallow area. Changing the course in response results in a direct feedback by a decreasing signal saliency when the correct maneuver is applied and an increasing saliency when steering in the wrong direction.

These advantages also become apparent when considering another well-known nautical tragedy: In 1912 the RMS Titanic collided with an iceberg at full cruising speed. A stimulation based on a signal that encodes only the direction and the absolute spatial distance on the same scale as a signal that is in use for slow moving scenarios would have been of little use in this case. It would have reached a noticeable strength only briefly before impact. In contrast, a signal encoding the TTC is applicable both in slow as well as in fast moving scenarios. It would have given an early notice of appropriate saliency upon detection of the iceberg because it takes the moving speed into account.

Thus with a directional TTC-encoding signal, collisions at high traveling speed could be avoided more easily and slow controlled maneuvering in difficult environments would be facilitated.

But the invention is also useful in situations where no vehicles at all are involved. For example ski slopes are dangerous terrain. The direction of travel is mostly downhill but variations in individual course, speeds, skills and blood alcohol levels make a constant monitoring of one's surroundings and the ability to react quickly crucial for a safe and enjoyable experience. A device that can support skiers and snowboarders in this monitoring task by providing information about the direction and urgency of collision risks could improve safety on slopes.

Also in this scenario a signal that communicates the TTC rather than an absolute distance has advantages:

A nearby skier whose trajectory does not spatiotemporally intersect with the own trajectory is not immediately safety-relevant. People who are skiing together in relatively close proximity might actually be annoyed by a signal that communicates the spatial distance. Furthermore, in more crowded scenarios constant simultaneous vibrations communicating the spatial distance to objects in multiple directions could confuse people and mask signals that are actually relevant such as, for instance, information about the fast approach of someone who lost control after catching an iced edge in the ground.

In contrast to the vehicle scenarios described above, the skiing/snowboarding scenario puts rather strong constraints on the installation of required sensors and processing units. One possible alternative to wearable sensors could be an external monitoring of the slope and the locations and velocities of people. Warning signals could then be computed by processor 5 of a central service and sent to the devices worn by people on the slope which includes the driver 7 and actuator 8.

In the specific cases illustrated here, the communicated direction information of an event may be limited to two spatial dimensions in a way such that a driver navigator or skier may be informed about where an object is horizontally with respect to the own vehicle or the person itself but not at which altitude the object is located or how tall it is.

For this assistance system preferably the tactile sense of the driver, navigator, skier is used as a channel for signal transmission. Communication is realized in the form of an array of tactile actuators (e.g. vibrotactile) which is arranged around the driver's torso and which is capable of simultaneously varying the perceived stimulus locations, frequencies and amplitudes. Using this interface, the direction towards a relevant entity with a TTC below a certain threshold corresponds to the location of the driver's torso which is oriented towards this direction. For each such direction, additionally the TTC is encoded in the vibration frequency such that the frequency approaches the assumed optimal excitation frequency for human lamellar corpuscles with shortening of the TTC which has the advantage of coupling stimulus detectability with situation urgency. Furthermore, the encoding in frequency has high potential for personalization because stimulus amplitude and frequency range could be adapted to the driver's preferences and sensitivity, which lowers the risk of creating annoying or undetectable signals.

To form the actuator 8 as mentioned in FIG. 8 the actuator 8 comprises a plurality of actuator elements that are attached to the user's seat belt and embedded in the area of the user's seat that is in contact with his or her lower back. This setup would have the advantage that a user would not need to be bothered with putting on additional equipment which increases the probability of actual usage in places where seat belts are common or even a legal requirement. Alternatively the actuators could also be embedded in a belt, jacket or another piece of clothing that can be extended with an arrangement of tactile actuator elements around the waist of the wearer. To account for different body shapes, the placement and/or the control of the actuators would have to be adapted such that the perceived signal location always corresponds to the correct direction with respect to the spatial frame of reference of the body. In the case of using a seat belt, the mapping of actuator directions could for instance be a function of the belt's length around the waist. In addition the use of an actuator-array with sufficient spatial resolution, the exploitation of vibrotactile illusions or a combination of both could aid in achieving this personalization.

The invention claimed is:

1. A method for assisting a person in assessing a dynamic environment, comprising steps of:

obtaining information on states of at least two entities in a common environment;

predicting a future behavior of each of the entities based on the obtained information and at least one event involving the at least two entities;

estimating a time to event for the at least one predicted event involving the at least two entities and a position of occurrence of the at least one predicted event relative to the person or to a predetermined entity associated with the person; and generating a signal for driving an actuator indicative of a relative direction of the predicted event with respect to the person and indicative of the time to event, the signal causing a stimulation being perceivable by the person by its perceptual capabilities, wherein the stimulation is a stimulation signal causing the stimulation of the person at a dedicated location of the person's body to encode the relative direction, and one or more parameters of the stimulation signal encode the time to event such that the signal's saliency is higher the smaller the time to event is.

2. The method according to claim 1, wherein the time to event estimation or the signal is adapted to a context for which an estimation of the time to event is performed.

3. The method according to claim 1, wherein the stimulation is a tactile stimulation signal.

4. The method according to claim 1, wherein the stimulation comprises an auditory stimulation signal causing sound to be generated at a location representative for the relative direction, wherein one or more parameters of the sound encode the time to event.

5. The method according to claim 1, wherein the stimulation comprises a visual stimulation signal causing a visual stimulus to be generated at a location representative for the relative direction, wherein one or more parameters of the visual stimulation signal encode the time to event.

6. The method according to claim 1, wherein the stimulation signal comprises an electromagnetic stimulation signal interacting with the person's nervous system or body parts, the electromagnetic stimulation signal being applied to the person such that it stimulates at a location of the body representative for the relative direction, wherein one or more parameters of the electromagnetic stimulation signal encode the time to event.

7. The method according to claim 1, wherein the stimulation signal comprises a chemical stimulation signal which is applied to the person such that it stimulates at a location of the body representative for the relative direction, wherein one or more parameters of the chemical stimulation signal encode the time to event.

8. The method according to claim 1, wherein the stimulation signal comprises a heat stimulation signal which is applied to the person at a dedicated location of the person's body to encode the relative direction, wherein a level of heat encodes the time to event.

9. The method according to claim 8, wherein the stimulation signal's saliency is compensated for different sensitivity of different locations of a body where it is applied and for different environmental conditions.

10. The method according to claim 1, wherein the at least one predicted event is a collision between at least two of the entities.

11. A system for assisting a person in assessing a dynamic environment, the system comprising:

a state information obtaining unit for obtaining information on states of at least two entities in a common environment;

processor for predicting a future behavior of each of the entities based on the obtained information, for predicting at least one event involving the at least two entities, and for estimating a time to event for the at least one predicted event and a position of occurrence of the at least one predicted event relative to the person; and signal generator for generating a signal indicative of the relative direction of the event with respect to the person and indicative of the time to event, the signal causing an actuator to stimulate the person such that the stimulation is perceivable by the person using its perceptual capabilities, wherein the signal is a stimulation signal causing the stimulation of the person at a dedicated location of the person's body to encode the relative direction, and one or more parameters of the stimulation signal encode the time to event, wherein the time to event being encoded such that the signal's saliency is higher the smaller the time to event is.

12. The system according to claim 11, wherein the system comprises a plurality of actuator elements of at least one of the following types vibrotactile actuator, pressure-applying actuator, loudspeaker, light emitter, electrode, induction coil, chemical emitter/agent, and heating element.

13. The system according to claim 12, wherein the plurality of actuator elements is arranged as an array.

14. The method according to claim 1, further comprising: selecting a basis for generating the signal from at least one of event, time to event, and direction.

15. The method according to claim 14, wherein the selecting is based on at least one of an availability of predictions in a given direction, context dependent criteria, a proximity of event, relevance of an entity, certainty of prediction, impact of false signals, and result of a comparison of a time to event with a threshold.

16. The method according to claim 1, further comprising: adapting a stimulus frequency range and a stimulus amplitude range to a preference and a sensitivity of the person.

* * * * *